Nov. 28, 1950

F. KERKHOF
DEVICE FOR PRODUCING SAWTOOTH CURRENTS OR VOLTAGES
Filed July 20, 1946

2,531,850

INVENTOR
FREDERIK KERKHOF
BY [signature]
AGENT

Patented Nov. 28, 1950 2,531,850

UNITED STATES PATENT OFFICE 2,531,850

DEVICE FOR PRODUCING SAWTOOTH CURRENTS OR VOLTAGES

Frederik Kerkhof, Eindhoven, Netherlands, assignor to Hartford National Bank and Trust Company, Hartford, Conn., as trustee Application July 20, 1946, Serial No. 685,119
In the Netherlands June 1, 1945

Section 1, Public Law 690, August 8, 1946
Patent expires June 1, 1965

4 Claims. (Cl. 250—27)

For producing a balanced sawtooth current or voltage such, for example, as is desired for cathode-ray tubes with magnetic or electrostatic deflection, use may be made of a phase inverting amplifying system. An unbalanced sawtooth voltage is supplied as a control voltage to one of the phase inverting tubes and the control voltage for the second phase inverting tube is derived, via a voltage divider, from the anode circuit of the first phase inverter tube.

In such a phase inverting amplifier for producing balanced sawtooth voltages it is advantageous to utilize two identical amplifying systems which may be arranged in the same bulb.

The present invention purports to provide a particular form of a phase inverting amplifier of the described type which, starting with a non-linear, unbalanced, sawtooth voltage as a control voltage for the amplifier, an exactly balanced sawtooth current or voltage, substantially linear with time, without the use of a phase inverting amplifier having two identical amplifying systems.

According to the invention the first amplifying system of the phase inverting amplifier exhibits a curved characteristic line correcting the non-linearity of the unbalanced sawtooth control voltage. The second amplifying system exhibits an identical characteristic line, also curved, which is made linear by the use of an out-of-phase voltage coupling.

It is known per se to compensate for the non-linearity of a sawtooth voltage by utilising an amplifying tube having a suitably curved grid voltage-anode current characteristic. This allows the generator for the production of the sawtooth oscillations to be of simple construction.

In order that the invention may be more clearly understood and readily carried into effect, it will now be described more fully with reference to the accompanying drawing.

Figure 1:
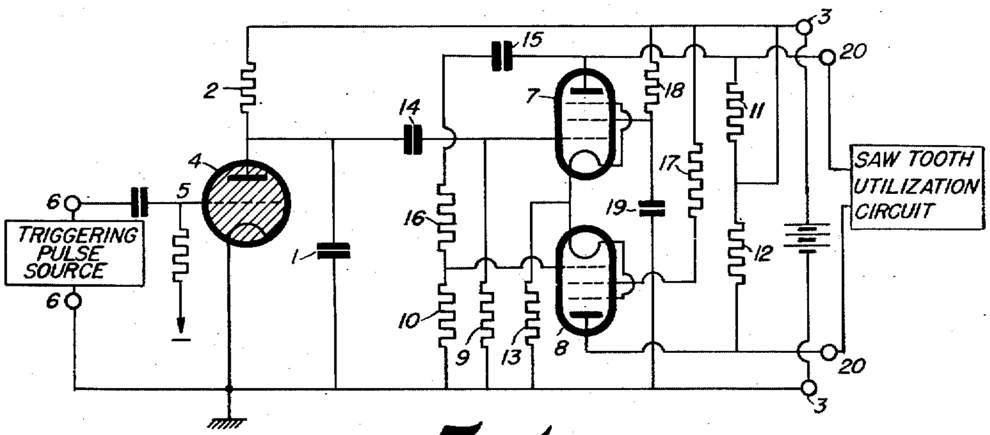
Figure 1 shows the circuit diagram of a device according to the invention.

The arrangement shown comprises a sawtooth generator of the type known per se, having a condenser 1 which is charged, via an ohmic resistance 2, by a direct-current voltage applied between terminals 3 and subsequently discharged by means of a gaseous discharge tube 4 having a control grid 5 to which short impulses are supplied via terminal 6.

Figure 2A:
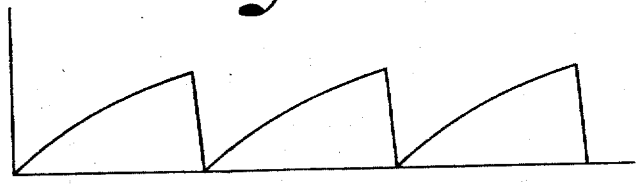
Figure 2 shows voltage-time diagrams which serve to explain the operation of the circuit shown in Figure 1.

The sawtooth voltage set up in this arrangement at condenser 1 exhibits, for example, the exponential variation shown in Figure 2*a* and on account of its non-linearity is thus not suitable as a deflecting voltage for cathode-ray tubes if, such as for television and mostly also for measuring purposes, a time-base linear with time is required. Besides, the voltage is not symmetric with respect to the zero line whereas in most cases a push-pull deflecting voltage, that is to say a voltage which is symmetric with respect to the zero line, is desirable.

Figure 2B:
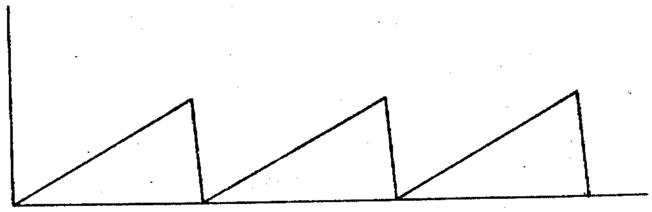

To obtain a balanced linear sawtooth voltage, the unbalanced sawtooth voltage set up at condenser 1 is supplied as a control voltage to a pseudo push-pull amplifier having two pentodes 7, 8, grid resistances 9, 10, anode resistances 11, 12, and a resistance 13, which is common to the two tubes and which serves to produce a negative grid-bias and also for stabilisation. The control voltage is supplied, via a coupling condenser 14, to the control grid of tube 7, whereas the balanced output voltage may be derived from output terminals 20. The tubes 7 and 8 are of the same type and exhibit a grid voltage-anode current characteristic line which is so exponentially curved as to compensate for the non-linearity of the sawtooth voltage applied to the grid of tube 7. Thus a substantially linear sawtooth voltage (vide Fig. 2*b*) is produced at the anode resistance 11 of tube 7 because of the compensating action of the grid voltage-anode current characteristic. The input voltage of push-pull amplifying tube 8 is derived from the linear sawtooth voltage via a voltage divider 16, 10, coupled to the anode of tube 7 through a condenser 15. In order to prevent the linear input voltage from being deformed by the curved characteristic line of this tube in an undesirable manner, it is made linear by the use of an out-of-phase voltage possessing inverse characteristics to that of the tube 8. This particularly strong out-of-phase voltage may be supplied to tube 8 in different manners. In the example, this is achieved by applying an out-of-phase voltage to the screen grid. For this purpose the screen grid of tube 8 is connected to a direct-current voltage supply via a resistance 17, in which event a voltage out-of-phase with the signal supplied to tube 8 is set up across the resistance 17. The result is that the deformation due to the non-linear characteristic of tube 8 is decreased. An out-of-phase voltage cannot be set up at resistance 18 included in the screen grid of tube 7, since this screen grid is connected to earth through a large condenser 19.

Owing to the large out-of-place voltage applied to the screen of tube 8, its amplification factor becomes small. Thus, a fairly large portion of the output voltage of tube 7 must be supplied as the input voltage to tube 8, that the output voltage of the latter may be made equal to that of tube 7.

In the foregoing it has been taken for granted that the non-linearity of the unbalanced sawtooth voltage is completely compensated by tube 7, which is desirable with a view to obtaining an exactly balanced output voltage. In practice it has been found that there is sometimes a non-linearity of the output sawtooth voltage brought about by the remaining curvature of the dynamic characteristic curve of tube 8. To correct this, the dynamic characteristic curve of tube 7 is chosen in such manner that a small undercompensation of the non-linearity of the control voltage across tube 7 occurs in such manner that the output voltage of the tube exhibits a small overcompensation.

What I claim is:

1. A balanced saw-tooth wave generator, comprising a source of a saw-tooth wave having a non-linear characteristic of given configuration, a first electron discharge tube system comprising a cathode, a control grid and an anode defining a cathode-grid circuit and a cathode-anode circuit and having a grid voltage-anode voltage non-linear characteristic of a configuration substantially inverse to said given configuration, means to apply said non-linear saw-tooth wave to said cathode grid circuit to produce in said cathode-anode circuit a linear saw-tooth wave, a second electron discharge tube system comprising a cathode, a control grid and an anode defining a second cathode-grid circuit and a second cathode-anode circuit and having a non-linear grid voltage-anode voltage characteristic, means to couple said first cathode-anode circuit to said second cathode-grid circuit to apply to said second cathode-grid circuit a saw-tooth wave having a substantially linear characteristic, and means to apply to said second discharge tube system an inverse feedback voltage to produce in said second discharge tube system a substantially linear grid voltage-anode voltage characteristic.

2. A balanced saw-tooth wave generator, comprising a source of a saw-tooth wave having a non-linear characteristic of given configuration, a first electron discharge tube system comprising a cathode, a control grid and an anode defining a cathode-grid circuit and a cathode-anode circuit and having a grid voltage-anode voltage non-linear characteristic of a configuration substantially inverse to said given configuration, means to apply said non-linear saw-tooth wave to said cathode grid circuit to produce in said cathode-anode circuit a linear saw-tooth wave, a second electron discharge tube system comprising a cathode, a control grid and an anode defining a second cathode-grid circuit and a second cathode-anode circuit and having a grid voltage-anode voltage non-linear characteristic substantially the same as the grid voltage-anode voltage characteristic of said first tube, means to couple said first cathode-anode circuit to said second cathode-grid circuit to apply to said second cathode-grid circuit a saw-tooth wave having a substantially linear characteristic, and means to apply to said second discharge tube system an inverse feedback voltage to produce in said second discharge tube system a substantially linear grid-voltage-anode voltage.

3. A balanced saw-tooth wave generator, comprising a source of a saw-tooth wave having a non-linear characteristic of given configuration, a first electron discharge tube system comprising a cathode, a control grid, a screen grid and an anode defining a cathode-grid circuit and a cathode-anode circuit and having a grid voltage-anode voltage non-linear characteristic of a configuration substantially inverse to said given configuration, a capacitor coupled between said screen grid and ground potential to decouple said screen grid at the frequency of said saw-tooth wave, means to apply said non-linear saw-tooth wave to said cathode-grid circuit to produce in said cathode-anode circuit a linear saw-tooth wave, a second electron discharge tube system comprising a cathode, a control grid, a screen grid and an anode defining a second cathode-grid circuit and a second cathode-anode circuit and having a non-linear grid voltage-anode voltage characteristic, means to couple said first cathode-anode circuit to said second cathode-grid circuit to apply to said second cathode-grid circuit a saw-tooth wave having a substantially linear characteristic, and means to apply to the screen grid of said second discharge tube system an inverse feedback voltage to produce in said second discharge tube system a substantially linear grid-voltage-anode voltage characteristic.

4. A balanced saw-tooth wave generator, comprising a source of a saw-tooth wave having a non-linear characteristic of given configuration, a first electron discharge tube system comprising a cathode, a control grid, a screen grid and an anode defining a cathode-grid circuit and a cathode-anode circuit and having a grid voltage-anode voltage non-linear characteristic of a configuration substantially inverse to said given configuration, a capacitor coupled between said screen grid and ground potential to decouple said screen grid at the frequency of said saw-tooth wave, means to apply said non-linear saw-tooth wave to said cathode-grid circuit to produce in said cathode-anode circuit a linear saw-tooth wave, a second discharge tube system comprising a cathode, a control grid, a screen grid and an anode defining a second cathode-grid circuit and a second cathode-anode circuit and having a grid voltage-anode voltage non-linear characteristic, means to couple said first cathode-anode circuit to said second cathode-grid circuit to apply to said second cathode-grid circuit a saw-tooth wave having a substantially linear characteristic, and a resistor coupled between the screen grid and the cathode-anode circuit of said second tube to apply to the screen grid of said second tube an inverse feedback voltage to produce in said second discharge tube system a substantially linear grid-voltage-anode voltage characteristic.

FREDERIK KERKHOF.

REFERENCES CITED

The following references are of record in the file of this patent:

UNITED STATES PATENTS

| Number | Name | Date |
|---|---|---|
| 2,179,414 | Konkle | Nov. 17, 1939 |
| 2,183,340 | Tolson | Dec. 12, 1939 |
| 2,232,076 | Newsam | Feb. 18, 1941 |
| 2,280,990 | White | Apr. 28, 1942 |
| 2,373,748 | Eaton | Apr. 17, 1946 |
| 2,422,182 | Bryant | June 17, 1947 |
| 2,431,832 | Schlesinger | Dec. 2, 1947 |
| 2,455,265 | Norgaard | Nov. 30, 1948 |